United States Patent [19]

Small

[11] Patent Number: 5,351,460
[45] Date of Patent: Oct. 4, 1994

[54] ELECTRICAL BOX LOCATOR

[76] Inventor: Herman Small, R.D. #7, Box 7115, Mercer, Pa. 16137

[21] Appl. No.: 791,795

[22] Filed: Oct. 25, 1991

[51] Int. Cl.$^5$ .................. E04G 23/00; B25B 11/00
[52] U.S. Cl. .................. 52/741.1; 52/127.1; 33/DIG. 10; 269/904
[58] Field of Search .......... 52/741.1, 127.1; 33/528, DIG. 10; 29/407; 269/904

[56] References Cited

U.S. PATENT DOCUMENTS

| | | | |
|---|---|---|---|
| 2,919,913 | 1/1960 | Phair | 33/DIG. 10 X |
| 3,954,717 | 5/1976 | Tarr | 33/DIG. 10 X |
| 4,096,964 | 6/1978 | Glick | 52/741 X |
| 4,750,271 | 6/1988 | Ericksen | 33/DIG. 10 X |
| 5,072,523 | 12/1991 | Bennett | 33/528 |
| 5,111,593 | 5/1992 | Gehen, Sr. | 33/DIG. 10 X |

*Primary Examiner*—Joseph M. Gorski
*Attorney, Agent, or Firm*—Nils H. Ljungman & Associates

[57] ABSTRACT

A tool for accurately positioning an electrical box on a wall stud in a building. The tool is preferably embodied by a strip of generally rigid material having a set of indentations for positioning the electrical box at any of several locations along a wall stud. The dimensions of the indentations are preferably such that the electrical box will not protrude beyond mounted drywall.

14 Claims, 2 Drawing Sheets

ELECTRICAL BOX LOCATOR

BACKGROUND OF THE INVENTION

1. Field of the Invention

The present invention relates to the installation of electrical boxes in a building.

2. Background Information

The installation of electrical boxes in a building can often be a time-consuming procedure. In order to place an electrical box along a wall stud, it is usually necessary to make precise, manual measurements in order to locate the box at a desired height. Furthermore, if drywall is to be mounted, care must generally be taken to position the electrical box such that it will not protrude beyond the outer surface of the mounted drywall. With conventional measuring means, the latter task often involves overcompensating for the position of the electrical box, such that, for example, the box may be located about ⅛" below the outer surface of the mounted drywall.

OBJECT OF THE INVENTION

It is an object of the present invention to provide a tool for accurately positioning an electrical box on a wall stud in a building.

SUMMARY OF THE INVENTION

This and other objects are achieved in accordance with the features of the present invention discussed hereinbelow.

Preferably, the locator tool of the present invention is primarily embodied by a strip of generally rigid material having a set of indentations for accurately positioning an electrical box at any of several locations along a wall stud. The dimensions of the indentations are selected such that the electrical box will not protrude beyond conventional drywall.

Assuming that drywall having a thickness of ½" is ultimately to be mounted on the wall studs, the locator tool of the present invention ensures that a front portion of the box will protrude 15/32" from the wall stud and will thus be located 1/32" inch beneath the outer surface of the drywall once the drywall is mounted. Other possible embodiments of the present invention may provide for positioning an electrical box similarly with respect to other thicknesses of drywall.

The indentations preferably correspond to several predetermined heights for mounting the electrical box along the wall stud. In a preferred embodiment of the present invention, these heights correspond to:

12" - for a standard receptacle;
43¼" - for a standard wall switch; and
48" - for a countertop wall receptacle.

Other possible embodiments of the present invention may provide for positioning an electrical box at other possible heights.

Thus, the present invention is essentially embodied by a tool which consistently provides an accurate positioning in mounting an electrical box along a wall stud, thus substantially eliminating the need for repetitive, time-consuming and potentially inaccurate manual measurements. An additional advantage of the present invention may be found in that after the electrical box has been positioned, the electrical box may immediately be mounted without the intervention of a marking step.

In a further embodiment of the present invention, the tool may be hinged at several places to ensure that it can be folded for easy portability.

One feature of the invention resides broadly in a method for manufacturing an apparatus for positioning an electrical box at a predetermined height along a side portion of a wall stud prior to overlaying wall material about the electrical box, the wall stud further having a front portion for the disposition of a portion of the wall material thereupon; and positioning the electrical box at the predetermined height along the side portion of the wall stud prior to overlaying wall material about the electrical box; the apparatus comprising: a strip having an overall length, width and depth; the strip having a front portion for being interfaced with the front portion of the wall stud; at least one recessed area being indented into the front portion of the strip; at least one of the at least one recessed area for being positioned adjacent the side portion of the wall stud; each of the at least one recessed area being configured to accommodate a portion of the electrical box; each of the at least one recessed area being disposed at a predetermined position along the strip; the predetermined position of at least one of the at least one recessed area corresponding to the predetermined height for mounting the electrical box along the side portion of the wall stud; each of the at least one recessed area having a side surface for being positioned substantially flush with the side portion of the wall stud; and the strip and at least one of the side surface of one of the at least one recessed area, and the side portion of the wall stud, for simultaneously contacting a portion of the electrical box for positioning the electrical box at the predetermined height: The method comprising the steps of: providing a mold for manufacturing the strip; configuring the mold to effect: the provision of the overall length, width and depth of the strip; the indenting of the at least one recessed area into the front portion of the strip; the configuration of the at least one recess to accommodate a portion of the electrical box; the disposition of each of the at least one recessed area at its predetermined position along the strip, such that the predetermined position of at least one recessed area corresponds to the predetermined height for mounting the electrical box along the side portion of the wall stud; interfacing the front portion of the strip with the front portion of the wall stud; positioning at least one of the at least one recessed area adjacent the side portion of the wall stud; positioning one of the at least one recess area such that the side surface of the one of the at least one recess area is substantially flush with the side portion of the wall stud and simultaneously contacting both the strip and at least one of: the side surface of the one of said at least one recessed area; and the side portion of the wall stud, with a portion of the electrical box for positioning the electrical box at the predetermined height.

Another feature of the invention resides broadly in a method for positioning an electrical box at a predetermined height along a side portion of a wall stud prior to overlaying wall material about the electrical box, the wall stud further having a front portion for the disposition of a portion of the wall material thereupon, wherein an apparatus for performing the method comprises: a strip having an overall length, width and depth; the strip having a front portion for being interfaced with the front portion of the wall stud; at least one recessed area being indented into the front portion of the strip; at least one of the at least one recessed area for being positioned adjacent the side portion of the wall stud; each of the at least one recessed area being configured to accommodate a portion of the electrical box; each of the at least one recessed area being disposed at a predetermined position along the strip; the predetermined position of at least one of the at least one recessed area corresponding to the predetermined height for mounting the electrical box along the side portion of the wall stud; each of the at least one recessed area having a side surface for being positioned substantially flush with the side portion of the wall stud; and the strip and at least one of: the side surface of one of the at least one recessed area and the side portion of the wall stud, for simultaneously contacting a portion of the electrical box for positioning the electrical box at the predetermined height; the method comprising the steps of: interfacing the front portion of the strip with the front portion of the wall stud; positioning at least one of the at least one recessed area adjacent the side portion of the wall stud; positioning one of the at least one recess area such that the side surface of the one of the at least one recess area is substantially flush with the side portion of the wall stud and simultaneously contacting both the strip and at least one of the side surface of: said one of said at least one recessed area and the side portion of the wall stud, with a portion of the electrical box for positioning the electrical box at the predetermined height.

Yet another feature of the invention resides broadly in an apparatus for positioning an electrical box at a predetermined height along a side portion of a wall stud prior to overlaying wall material about the electrical box, the wall stud further having a front portion for the disposition of a portion of the wall material thereupon, the apparatus comprising: a strip having an overall length, width and depth; the strip having a front portion for being interfaced with the front portion of the wall stud; at least one recessed area being indented into the front portion of the strip; at least one of the at least one recessed area for being positioned adjacent the side portion of the wall stud; each of the at least one recessed area being configured to accommodate a portion of the electrical box; each the at least one recessed area being disposed at a predetermined position along the strip; the predetermined position of at least one of the at least one recessed area corresponding to the predetermined height for mounting the electrical box along the side portion of the wall stud; each at least one recessed area having a side surface for being positioned substantially flush with the side portion of the wall stud; the strip and at least one of: the side surface of one of the at least one recessed area and the side portion of the wall stud for simultaneously contacting a portion of the electrical box for positioning the electrical box at the predetermined height.

BRIEF DESCRIPTION OF THE DRAWINGS

The present invention will be more readily understood in reference to the accompanying drawings, wherein.

DESCRIPTION OF THE PREFERRED EMBODIMENT(S)

Figure 1:
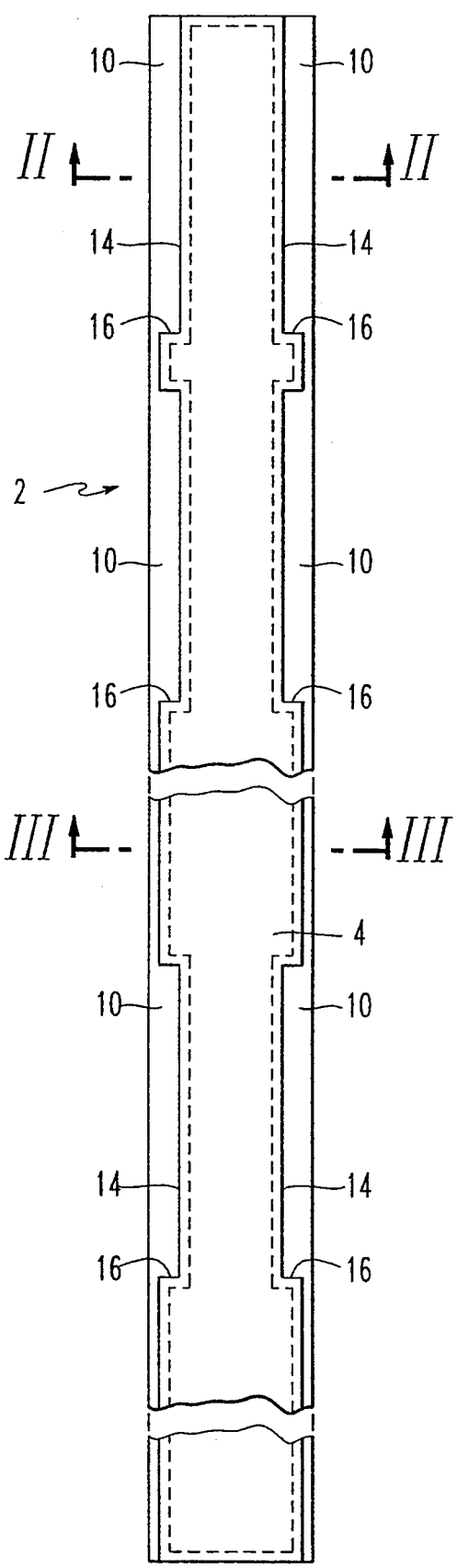
FIG. 1 is a front elevational view of a locator tool according to the present invention.
Figure 2:
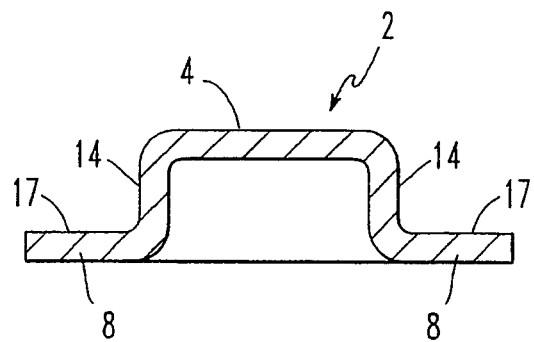
FIG. 2 is a cross-section taken through line (II—II) in FIG. 1.
Figure 3:
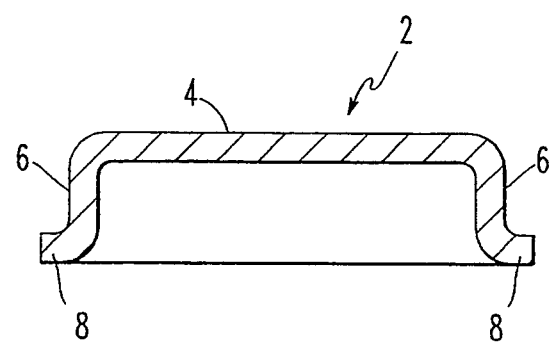
FIG. 3 is a cross-section taken through line (III—III) in FIG. 1.

FIGS. 1, 2 and 3 show, respectively, a front elevational view, a first cross-section and a second cross-section of a locator tool according to the present invention. As shown in FIG. 1, the locator tool is preferably embodied by a strip 2.

According to a preferred embodiment of the present invention, strip 2 generally has a C-shaped cross-section, as shown in FIG. 3. The C-shaped cross-section is formed by a frontal portion 4 and two side portions 6 generally perpendicular thereto. Furthermore, each side portion 6 has a flange portion 8 extending perpendicularly therefrom such that flange portions 8 are substantially parallel to frontal portion 4.

Referring again to FIG. 1, the strip 2 preferably includes three pairs of recesses 10, wherein each recess 10 forms an indentation into frontal portion 4 and one of the side portions 6. Each recess has a side surface 14 generally parallel to the side portions 6 of strip 2. Each recess is further embodied by ledge surfaces 16, perpendicular to side surfaces 14. Each recess 10 is preferably disposed opposite a corresponding recess 10 such that the strip 2 exhibits longitudinal symmetry.

FIG. 2 shows a cross-section of a portion of strip 2 in which a pair of recesses 10 is disposed. It will be apparent that, here, there is also a C-shaped cross section with frontal portion 4, side surface 14 and flange portions 8. It will be appreciated that, because of the recesses 10, the flange portions 8 are longer and the frontal portion 4 is narrower than in sections of the strip 2 in which recesses 10 are not present.

Each recess 10 also has a back portion 17 which defines the depth of the recess.

Figure 5:
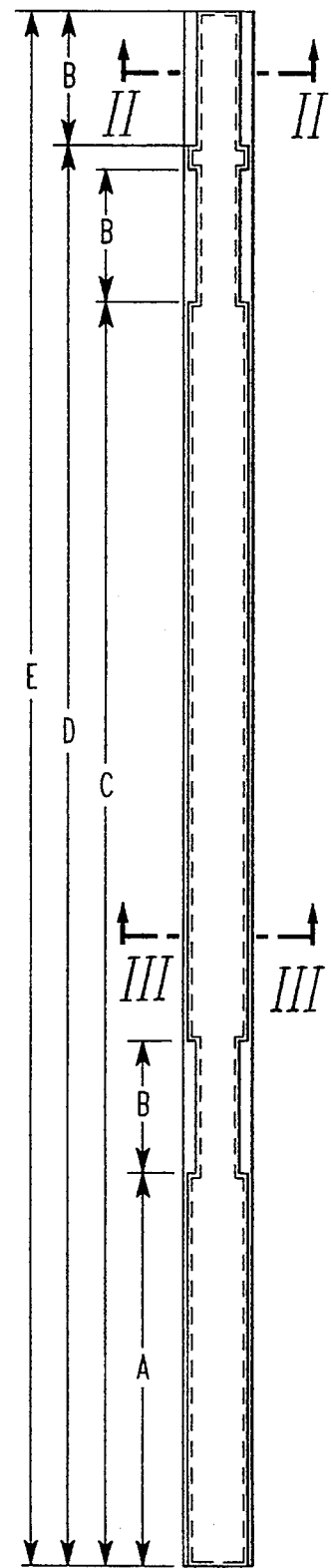
FIG. 5 is the substantially same view as FIG. 1.
Figure 6:
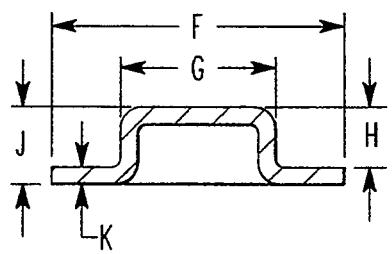
FIG. 6 is the substantially same view as FIG. 2.
Figure 7:
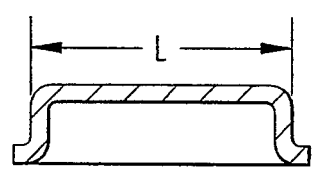
FIG. 7 is the substantially same view as FIG. 3.

In reference to FIGS. 5, 6 and 7, the following dimensions have been selected for a preferred embodiment of the present invention:

"A," from a lower end of the strip to a lower end of a first set of recesses 10—12";

"B," a longitudinal dimension of each recess 10—4";

"C," from a lower end of the strip 2 to a lower end of a second set of recesses 10—43¼";

"D," from a lower end of the strip to a lower end of a third set of recesses 10—48";

"E," the length of the strip 2—52";

"F," the width of the strip 2—2";

"G," the width of the frontal portion 4 of the strip 2 between a pair of recesses 10—1¼";

"H," the depth of a recess 10—15/32";

"J," distance from the frontal portion 4 of the strip 2 to an opposite, rear portion—19/32";

"K," the thickness of the strip 2 at substantially all areas of the strip—⅛"; and "L," the width of the frontal portion 4 of the strip 2 without recesses—1¾".

Essentially, the above dimensions ensure that the electrical box can be mounted at any of the following heights along a wall stud:

12" - for a standard receptacle

43¼" - for a standard wall switch; and

48" - for a countertop wall receptacle.

Further, if a drywall thickness of ½" is assumed, the above dimensions ensure that the electrical box will protrude 15/32" outwardly from the wall stud, such that the outermost portion of the electrical box will be located 1/32" beneath the surface of the mounted drywall.

It should be understood that a locator tool according to the present invention may be configured for use with other thicknesses of drywall and for mounting an electrical box at other possible heights. For example, for drywall having a thickness of ⅝", dimension H may be 19/32" to ensure that the electrical box is 1/32" beneath the surface of the mounted drywall. Additionally, dimension B may be such so that other sizes of electrical boxes can be accommodated.

Figure 4:
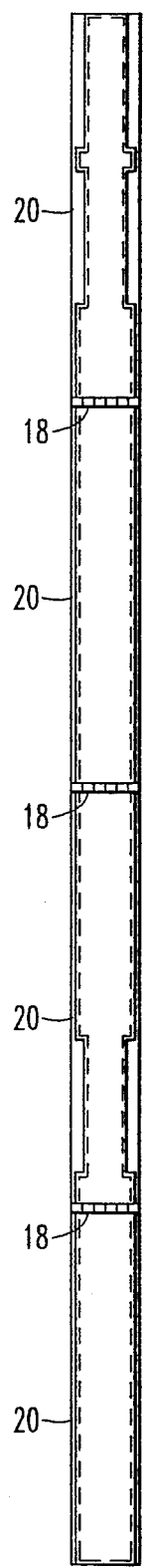
FIG. 4 is a front elevational view of another embodiment of the present invention.

In reference to FIG. 4, the strip 2 may have hinges 18 to permit the folding of the strip 2. As shown a preferred embodiment of the present invention may include three such hinges 18, disposed at intervals which, preferably are substantially regular and ensure that no hinge 18 is located in the area of a recess 20, for folding the strip 2 into four sections 20.

The strip 2 preferably comprises a generally rigid but pliable polymer material, such as fiberglass. Other suitable materials may be aluminum and plastic, such as ABS plastic. Another example of a material which may be utilized in manufacturing a locator tool according to the present invention is a peel ply polyester for use with phenolics and for general purposes, available from the Lockheed Aeronautical Systems Company, listed as Item No. G22.5239.

Use of the Electrical Box Locator

The use of a locator tool according to the present invention will now be illustrated by way of the following example.

First, the strip is placed in a interfacing, contacting relationship with the stud on which the electrical box is to be mounted. Particularly, the frontal portion 4 of the strip 2 should be held in contact with the front portion of the stud, that is, the portion of the stud upon which drywall will eventually be mounted.

Next, a recess r should be chosen which corresponds to the side of the stud and the height along the stud at which the electrical box is to be mounted. It should then be ensured that, while the frontal portion 4 is held against the stud, the side surface 14 of the desired recess 10 is flush with the side portion of the stud on which the electrical box is to be mounted.

Thence, the electrical box should be seated on ledge surface 16 of the desired recess 10 and held against both:

the flush surface defined by the side surface 14 of the recess 10 and the constituent side portion of the stud; and the back surface 17 of the recess 10. At that point, the electrical box may be mounted. As a particularly advantageous feature of the present invention, the electrical box may immediately be mounted on the wall stud without the need for an additional step of marking its position.

Manufacture of the Electrical Box Locator

It should be apparent that an electrical box locator according to the present invention may be manufactured in accordance with any of a number of widely known processes. For example, the locator tool may be manufactured by an injection molding process.

Generally, such a process may entail the following procedure:

1) Configuring a mold in accordance with the desired dimensions within the scope of the present invention.

2) Introducing a molten plastic material into an orifice leading from an external surface of the mold to the internal area of the mold.

3) Allowing the molten plastic to harden in a suitable period of time.

4) Separating the newly created locator tool from the mold.

It will be appreciated that, in accordance with the general procedure outlined immediately above, it is possible, with minimal alterations, to easily and readily customize a mold to manufacture a locator tool having essentially and dimensions and parameters desired by the manufacturer.

For example, it is apparent from the drawings that the creation of recesses 10 in a locator tool, according to the present invention, can easily be effected by the inclusion of several rectangular blocks at strategic areas about the internal periphery of the mold. In this manner, the positioning of recesses 10 along the length of strip 2 need not necessarily be limited to the preferred dimensions as set forth hereinabove. Additionally, the thickness of such rectangular blocks in a mold need not necessarily be 15/32". More particularly, as was also stated above, the depth of a recess 10, that is, the value of dimension "H", can easily be customized to the intended thickness of drywall to be mounted. Therefore, for example, as an adjunct to an example stated above, rectangular blocks having a thickness of 19/32" may be used in a mold in order to create recesses 10 having a depth of 19/32" for an intended drywall thickness of ⅝".

As should be apparent from the disclosure heretofor, a mold should be configured such that a substantially constant wall thickness is provided throughout substantially the entire strip 2. For example, according to the preferred dimensions set forth above, this constant wall thickness could be ⅛". It should be appreciated that this substantially constant, generally thin wall thickness provides for a certain degree of pliability of the locator tool. Thus, even though the locator tool preferably comprises a substantially rigid material and is generally self-supporting, the tool still maintains a substantial degree of torsional pliability.

Of course, methods other than injection molding may be used to manufacture a locator tool according to the present invention. For example, if the strip 2 is to be made of aluminum, it may be possible to create a locator tool by starting with a sheet of aluminum having a generally constant thickness and kinking the sheet in the appropriate areas to create the recesses 10, flanges 8, side portions 6, and other components of the strip 2.

All, or substantially all, of the components and methods of the various embodiments may be used with at least one embodiment or all of the embodiments, if any, described herein.

All of the patents, patent applications and publications recited herein, if any, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A method for:

manufacturing an apparatus for positioning at least one electrical box at a predetermined height along a side portion of a wall stud prior to overlaying wall material about the at least one electrical box, the wall stud further having a front portion for the disposition of a portion of the wall material thereupon, the at least one electrical box having outer top and bottom portions, an outer front portion and at least one outer side portion; and positioning the at least one electrical box at the predetermined height along the side portion of the wall stud prior to overlaying wall material about the at least one electrical box;

said apparatus comprising:

a strip having an overall length, width and depth and at least one end;

the strip having a front portion for being interfaced with the front portion of the wall stud;

the strip having at least one recessed area being indented into the front portion of the strip and for being positioned adjacent the side portion of the wall stud;

the at least one recessed area being configured to accommodate a portion of the at least one electrical box;

the at least one recessed area being disposed at a predetermined position along the strip;

the predetermined position of the at least one recessed area corresponding to the predetermined height for mounting the at least one electrical box along the side portion of the wall stud;

the at least one recessed area having a substantially flat side surface, said substantially flat side surface for being positioned substantially flush with the side portion of the wall stud and for receiving and contacting a side portion of the at least one electrical box for positioning the at least one electrical box;

the at least one recessed area having a back portion, having a substantial portion which is flat, said back portion of receiving and contacting a front portion of the at least one electrical box for positioning the at least one electrical box;

the at least one recessed area having a top portion, having a substantial portion which is flat, said top portion for receiving and contacting a top portion of the at least one electrical box for positioning the at least one electrical box;

the at least one recessed area having a bottom portion, having a substantial portion which is flat, said bottom portion for receiving and contacting a bottom portion of the at least one electrical box for positioning the at least one electrical box;

the strip being configured such that, during positioning of the at least one electrical box at the predetermined height, the back portion of the at least one recessed area and the side portion of the wall stud; simultaneously contact a portion of the at least one electrical box for positioning the at least one electrical box at the predetermined height;

said top portion being disposed away from said bottom portion a distance to receive the at least one electrical box;

said distance between said top portion and said bottom portion being substantially the same as a distance between the outer bottom portion and the outer top portion of an electrical box;

said flat side surface being disposed substantially orthogonally to and adjacent to all of: said back portion, said top portion and said bottom portion;

said flat side surface intersecting all of: said back portion, said top portion and said bottom portion, to form a first intersection means;

said back portion being disposed substantially orthogonally to and adjacent to both said top portion and said bottom portion;

said back portion intersecting both said top portion and said bottom portion, to form a second intersection means;

the intersection means being disposed:

to form a first internal edge between said flat side surface and back portion within the at least one recessed area, to form a second internal edge between said flat side surface and said top portion within the at least one recessed area, to form a third internal edge between said flat side surface and said bottom portion within the at least one recessed area, to form a fourth internal edge between said back portion and said bottom portion within the at least one recessed area, to form a fifth internal edge between said back portion and said top portion within the at least one recessed area, to form a first internal corner, within the at least one recessed area, from said flat side portion, said back portion and said top portion, and said first internal edge, said second internal edge and said fifth internal edge, to form a second internal corner, within the at least one recessed area, from said flat side portion, said back portion and bottom portion, and said first internal edge, said third internal edge and said fourth internal edge;

the front portion of the strip being disposed substantially orthogonally to said flat side surface, said top portion and said bottom portion;

said first internal corner portion being disposed in the at least one recessed area opposite to said second internal corner;

said flat side area, said back portion, said top portion and said bottom portion comprising a single surface to receive and make contact with an outer side portion, the outer top and bottom portions and the front portion of the at least one electrical box; said method comprising the steps of: providing a mold for manufacturing the apparatus; configuring the mold to effect:

the provision of the overall length, width and depth of the strip; and the indenting of the at least one recessed area into the front portion of the strip;

forming the apparatus in the mold;

interfacing the front portion of the strip with the front portion of the wall stud;

positioning the at least one recessed area adjacent the side portion of the wall stud;

positioning the at least one recessed area such that the side surface of the at least one recessed area is substantially flush with the side portion of the wall stud; and simultaneously contacting both:

the back portion of the at least one recessed area;

and the side portion of the wall stud; with a portion of the at least one electrical box for positioning the at least one electrical box at the predetermined height; and positioning the at least one electrical box against said continuous surface comprising said flat side surface, said back portion, said top portion, and said bottom portion and the corners of said at least one recessed area and positioning the at least one electrical box at a predetermined height while positioning one end of said strip against a reference area.

2. The method according to claim 1, further comprising:

configuring the back portion of the at least one recessed area such that the back portion is generally parallel to the length of the strip;

the side surface of the at least one recessed area defining a depth of the at least one recessed area between the front portion of the strip and the back portion of the at least one recessed area; and configuring the strip such that the depth of the at least one recessed area corresponds to a predetermined extent of protrusion of the at least one electrical box beyond the front portion of the wall stud.

3. The method according to claim 2, wherein the wall material for being overlayed has a generally constant thickness, said method further comprising:

configuring the strip such that the depth of the at least one recessed area is less than the generally constant thickness of the wall material.

4. The method according to claim 3, further comprising: configuring the strip such that the depth of at least one of the at least one recess is less than or equal to about 1/32 inch less than the generally constant thickness of the wall material.

5. The method according to claim 4, wherein the strip has an overall thickness defined between a rear portion of the strip and the front portion of the strip, said method further comprising:

configuring the strip such that the thickness of the strip is substantially constant throughout substantially the entire the strip.

6. The method according to claim 5, wherein the strip has two ends defining the length of the strip and the at least one recessed area comprises at least one pair of recesses, said method further comprising:

disposing both recesses of the at least one pair of recesses substantially equidistantly from a first end of the strip.

7. The method according to claim 6, further comprising: disposing one of the at least one pair of recesses about 12 inches from a first end of the strip.

8. The method according to claim 7, further comprising: disposing a second of the at least one pair of recesses about 43½ inches from the first end of the strip.

9. The method according to claim 8, further comprising: disposing a third of the at least one pair of recesses about 48 inches from the first end of the strip.

10. The method according to claim 9, further comprising: configuring each of the recesses such that the depth of each of the recesses is about 15/32 inches.

11. The method according to claim 10, wherein each of the recesses has a length defined parallel to the length of the strip, said method further comprising:

configuring each of the recesses such that the length of each of the recesses is about 4 inches.

12. The method according to claim 11, further comprising:

configuring the strip such that the length of the strip is about 52 inches.

13. The method according to claim 12, further comprising:

configuring the strip such that the strip comprises a material from the group consisting of: a) a generally rigid polymer material; b) a plastic material; c) a fiberglas material; and d) aluminum;

configuring the strip such that:

the strip consists of a single component;

the overall width of the strip is about 2 inches;

the overall depth of the strip is about 19/32 inch;

the wall thickness of the strip is about ⅛ inch;

the front portion of the strip has a varying width;

the width of the front portion of the strip is about 1¾ inches; and indenting the recesses into the width of the front portion of the strip such that, between a pair of the recesses, the front portion of the strip has an effective width of about 1¼".

14. A method for positioning at least one electrical box at a predetermined height along a side portion of a wall stud prior to overlaying wall material about the at least one electrical box, having an outer side portion, outer top and bottom portions and an outer back portion; the wall stud further having a front portion for the disposition of a portion of the wall material thereupon, wherein an apparatus for performing said method comprises:

a strip having an overall length, width and depth and at least one end;

the strip having a front portion for being interfaced with the front portion of the wall stud;

the strip having at least one recessed area being indented into the front portion of the strip and for being positioned adjacent the side portion of the wall stud;

the at least one recessed area being configured to accommodate a portion of the at least one electrical box;

the at least one recessed area being disposed at a predetermined position along the strip;

the predetermined position of the at least one recessed area corresponding to the predetermined height for mounting the at least one electrical box along the side portion of the wall stud;

the at least one recessed area having a substantially flat side surface, said substantially flat side surface for being positioned substantially flush with the side portion of the wall stud and for receiving and contacting the outer side portion of the at least one electrical box for positioning the at least one electrical box;

the at least one recessed area having a back portion, having a substantial portion which is flat, said back portion for receiving and contacting the outer front portion of the at least one electrical box for positioning the at least one electrical box;

the at least one recessed area having a top portion, having a substantial portion which is flat, said top portion for receiving and contacting the outer top portion of the at least one electrical box for positioning the at least one electrical box;

the at least one recessed area having a bottom portion, having a substantial portion which is flat, said bottom portion for receiving and contacting the outer bottom portion of the at least one electrical box for positioning the at least one electrical box;

the strip being configured such that, during positioning of the at least one electrical box at the predetermined height, the back portion of the at least one recessed area and the side portion of the wall stud simultaneously contact a portion of the at least one electrical box for positioning the at least one electrical box at the predetermined height;

said top portion being disposed away from said bottom portion a distance to receive the at least one electrical box;

said distance between said top portion and said bottom portion being substantially the same as a distance between the outer bottom portion and the outer top portion of an electrical box;

said flat side surface being disposed substantially orthogonally to and adjacent to all of: said back portion, said top portion and said bottom portion;

said flat side surface intersecting all of: said back portion, said top portion and said bottom portion, to form a first intersection;

said back portion being disposed substantially orthogonally to and adjacent to both said top portion and said bottom portion;

said back portion intersecting both said top portion and said bottom portion, to form a second intersection;

the intersections being disposed:

to form a first internal edge between said flat side surface and back portion within the at least one recessed area, to form a second internal edge between said flat side surface and said top portion within the at least one recessed area, to form a third internal edge between said flat side surface and said bottom portion within the at least one recessed area, to form a fourth internal edge between said back portion and said bottom portion within the at least one recessed area, to form a fifth internal edge between said back portion and said top portion within the at least one recessed area, to form a first internal corner, within the at least one recessed area, from said flat side portion, said back portion and said top portion, and said first internal edge, said second internal edge and said fifth internal edge, to form a second internal corner, within the at least one recessed area, from said flat side portion, said back portion and bottom portion, and said first internal edge, said third internal edge and said fourth internal edge;

the front portion of the strip being disposed substantially orthogonally to said flat side surface, said top portion and said bottom portion;

said first internal corner portion being disposed in the at least one recessed area opposite to said second internal corner;

said flat side area, said back portion, said top portion and said bottom portion comprising a single surface to receive and make contact with an outer side portion, the outer top and bottom portions and the front portion of the at least one electrical box;

said method comprising the steps of:

interfacing the front portion of the strip with the front portion of the wall stud;

positioning the at least one recessed area adjacent the side portion of the wall stud;

positioning the at least one recessed area such that the side surface of the at least one recessed area is substantially flush with the side portion of the wall stud;

simultaneously contacting both:

the back portion of the at least one recessed area and the side portion of the wall stud; with a portion of the at least one electrical box for positioning the at least one electrical box at the predetermined height;

said flat side area, said back portion, said top portion and said bottom portion of said at least one recessed area adjoining one another and forming an area to receive the at least one electrical box; and positioning the at least one electrical box against said continuous surface comprising said flat side surface, said back portion, said top portion, and said bottom portion and the corners of said at least one recessed area and positioning the at least one electrical box at a predetermined height while positioning one end of said strip against a reference area.

* * * * *